(12) United States Patent
Chikuma et al.

(10) Patent No.: US 9,731,575 B2
(45) Date of Patent: Aug. 15, 2017

(54) SUSPENSION APPARATUS

(75) Inventors: Hiroshi Chikuma, Matsudo (JP);
Ryusuke Hirao, Kamagaya (JP);
Nobuyuki Ichimaru, Yokohama (JP);
Masaaki Uchiyama, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 13/425,908

(22) Filed: Mar. 21, 2012

(65) Prior Publication Data

US 2012/0247888 A1 Oct. 4, 2012

(30) Foreign Application Priority Data

Mar. 30, 2011 (JP) .................................. 075573/2011

(51) Int. Cl.
*B60G 17/08* (2006.01)
*F16F 9/46* (2006.01)

(52) U.S. Cl.
CPC .............. *B60G 17/08* (2013.01); *F16F 9/468* (2013.01); *B60G 2400/10* (2013.01); *B60G 2500/10* (2013.01)
USPC .................... 280/5.515; 701/37; 188/266.1

(58) Field of Classification Search
CPC B60G 17/08; B60G 2400/10; B60G 2500/10; F16F 9/468; F16F 2228/00
USPC ....... 280/5.507, 5.508, 5.513, 5.515; 701/37, 701/38; 188/266.1
See application file for complete search history.

(56) References Cited

U.S. PATENT DOCUMENTS

| 5,024,460 | A | 6/1991 | Hanson et al. | |
| 5,322,320 | A * | 6/1994 | Sahashi et al. | ............ 280/5.515 |
| 5,425,436 | A | 6/1995 | Teramura et al. | |
| 5,839,082 | A | 11/1998 | Iwasaki | |
| 6,058,340 | A | 5/2000 | Uchiyama et al. | |
| 7,958,981 | B2 * | 6/2011 | Teraoka | ................ F16F 9/5126 188/298 |
| 8,240,679 | B2 * | 8/2012 | Kajino | ........................ 280/5.515 |

(Continued)

FOREIGN PATENT DOCUMENTS

| JP | 3-292210 | 12/1991 |
| JP | 5-16632 | 1/1993 |

(Continued)

OTHER PUBLICATIONS

Offer of Information submitted Jul. 18, 2014 (with partial English translation).

(Continued)

*Primary Examiner* — Paul N Dickson
*Assistant Examiner* — Timothy Wilhelm
(74) *Attorney, Agent, or Firm* — Wenderoth, Lind & Ponack, L.L.P.

(57) ABSTRACT

Shock absorbers of left and right front wheel suspensions and shock absorbers of left and right rear wheel suspensions each are constituted by a damping force adjustable hydraulic shock absorber provided with a frequency response unit. An actuator of a damping force variable mechanism provided to the shock absorber is driven and controlled by a controller. The controller variably adjusts the damping force between the soft side and the hard side by the damping force variable mechanism according to a vertical vibration when a vehicle body vertically vibrates at a low frequency. The controller does not adjust the damping force when the vehicle body vibrates at a higher frequency than the low frequency.

8 Claims, 5 Drawing Sheets

(56) References Cited

U.S. PATENT DOCUMENTS

| | | | |
|---|---|---|---|
| 2004/0150361 | A1 | 8/2004 | Hio et al. |
| 2009/0043452 | A1* | 2/2009 | Sekiya ............... B60G 17/0165 |
| | | | 701/40 |
| 2009/0085309 | A1 | 4/2009 | Hirao et al. |
| 2011/0214953 | A1* | 9/2011 | Maeda et al. ................. 188/266 |

FOREIGN PATENT DOCUMENTS

| | | |
|---|---|---|
| JP | 6-166316 | 6/1994 |
| JP | 7-101220 | 4/1995 |
| JP | 7-172129 | 7/1995 |
| JP | 7-232530 | 9/1995 |
| JP | 9-175137 | 7/1997 |
| JP | 11-321268 | 11/1999 |
| JP | 2004-237824 | 8/2004 |
| JP | 2006-336816 | 12/2006 |
| JP | 2008-298227 | 12/2008 |
| JP | 2009-83614 | 4/2009 |
| JP | 2009-83641 | 4/2009 |
| JP | 2009-262926 | 11/2009 |
| JP | 2010-83329 | 4/2010 |

OTHER PUBLICATIONS

Office Action dated Nov. 18, 2014 in corresponding Japanese patent application No. 2011-075573 (with English translation).
Office Action dated Oct. 20, 2015 in corresponding Japanese patent application No. 2015-008120 with partial English translation.
Office Action dated Apr. 26, 2016 in Japanese patent application No. 2015-008120 (with partial English translation).

* cited by examiner

SUSPENSION APPARATUS

BACKGROUND OF THE INVENTION

The present invention relates to a suspension apparatus mounted on a vehicle such as an automobile, and preferably used to absorb vibrations of the vehicle.

Generally, a vehicle such as a four-wheeled vehicle includes a shock absorber disposed between the vehicle body side and the respective wheel sides. Some of such shock absorbers can adjust its damping force by utilizing an actuator, and one known type of suspension apparatuses is configured to variably control the damping force characteristic according to, for example, the posture of the vehicle body and the state of vertical vibrations when the vehicle is running (for example, refer to Japanese Patent Application Public Disclosure No. H07-232530).

Such a suspension apparatus according to the conventional technique calculates a vertical absolute speed based on a signal from a G sensor, which detects a vertical acceleration of the vehicle body, and variably adjusts the damping force characteristic of the shock absorber according to the calculated absolute speed as well as determines whether a road surface on which the vehicle is currently running is in a good condition or a bad condition based on the signal from the G sensor. The suspension apparatus sets a small dead zone if the road surface is in a good condition while sets a large dead zone if the road surface is in a bad condition, whereby the suspension apparatus can reduce the influence of frequent vertical vibrations generated from the travel on the bad road, thereby maintaining the ride quality even when the vehicle is running on the bad road.

SUMMARY OF THE INVENTION

On the other hand, the suspension apparatus according to the conventional technique is configured to absorb vibrations of various frequencies from a low frequency to a high frequency when the vehicle is running, by a damping force generation mechanism (a mechanism of adjusting a damping force by an actuator) of the shock absorber. The suspension apparatus should control a damping force with excellent responsiveness, which enables the suspension apparatus to quickly respond, in order to control a damping force so as to deal with a vibration of a high frequency. However, a highly responsive controller is expensive, and also the actuator of the damping force generation mechanism should be embodied by a high-priced device if high responsiveness is required therefor.

Therefore, actually, the suspension apparatus lacking a highly responsive expensive controller and actuator gives up damping force control for the vibration region of a high frequency and scarifies ride comfort and steering stability in the high frequency region, while controlling a damping force only for the vibration region of a low frequency which does not require high responsiveness.

The present invention has been contrived in consideration of the above-described problem of the conventional technique, and an object of the present invention is to provide a suspension apparatus capable of controlling a damping force while covering a wide frequency range including a low frequency and a high frequency when a vehicle is running, even without an expensive controller and actuator.

To achieve the forgoing and other objects, according to one aspect of the present invention, a suspension apparatus includes a shock absorber disposed between a vehicle body side and a wheel side of a vehicle and capable of adjusting a damping force by an actuator, and a controller configured to adjust the actuator. The shock absorber includes a frequency response unit configured to reduce the damping force when a high-frequency vibration occurs. The controller adjusts the damping force according to a movement state when a movement of a low frequency occurs among movements of the vehicle, and the controller does not adjust the damping force according to the movement state or adjusts the damping force at a smaller level than a damping force adjustment level for the movement of the low-frequency when a movement of a higher frequency than the low frequency occurs.

DETAILED DESCRIPTION OF THE INVENTION

Exemplary embodiments of the present invention, which will be described below, can achieve not only the objects discussed in the sections "BACKGROUND OF THE INVENTION" and "SUMMARY OF THE INVENTION" but also other various objects, and are effective therefor. Main ones of the objects expected to be achieved by the below described exemplary embodiments are as follows.

[1] Improvement of Characteristic

One of required characteristic settings is that a frequency response unit should further smoothly change the damping force characteristic (a damping force against the piston speed) according to the state of vibrations. This is because sudden switching between the characteristic generating a small damping force and the characteristic generating a large damping force inevitably leads sudden switching of an actually generated damping force, thereby depriving ride comfort of the vehicle. Further, if the damping force is switched while a driver is operating the steering wheel of the vehicle, this may cause an unstable movement of the vehicle, whereby the driver may have an uncomfortable feeling against the steering operation. Especially, when the damping force is adjusted by an actuator to a higher damping force, it is important to further smoothly change the damping force characteristic, since the change in the damping force according to the frequency should be large in this case.

[2] Avoidance of Increase in Size

A high-output actuator effective for a high-frequency vibration raises such a problem that it should have a large solenoid. Further, providing a frequency response unit and a damping force adjustment unit by an actuator to a piston portion results in a further increase in the axial length of the piston portion, thereby axially increasing the whole cylinder apparatus including the actuator. The increase in the size of the cylinder apparatus adversely affects the flexibility in attachment of it to a vehicle body, whereby the increase in the axial length of the cylinder apparatus is a large problem.

[3] Reduction in Number of Parts

Accurate execution of control of a high-frequency vibration requires, for example, a highly sensitive acceleration sensor and vehicle height sensor to measure a vibration state (a vertical speed at the sprung side, a vertical speed at the unsprung side, and a relative speed). In this case, providing a large number of sensors raises a problem of an increase in the number of parts, and further raises a problem of difficulty in mounting it to the vehicle due to an increase in wirings required therefor. On the other hand, in recent years, there has been developed a suspension apparatus configured to estimate a vibration state while reducing the number of these sensors. However, just estimation of a vibration state cannot provide sufficient information for realizing accurate control of a high-frequency vibration.

Hereinafter, a suspension apparatus according to embodiments of the present invention will be described in detail with reference to the accompanying drawings, based on an example in which the suspension apparatus is applied to a four-wheeled vehicle.

Figure 1:
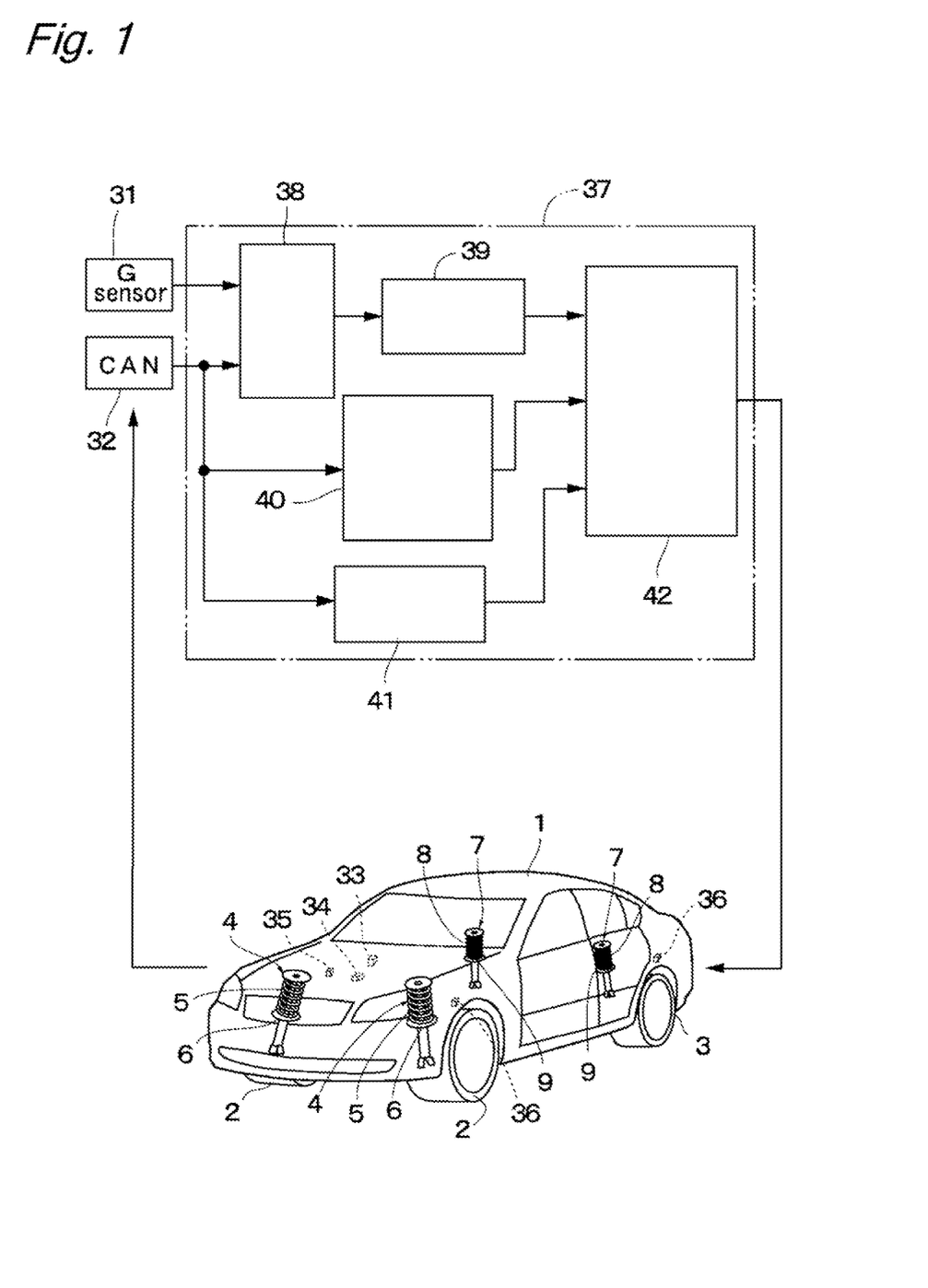
FIG. 1 illustrates the overall configuration of a four-wheeled vehicle, to which a suspension apparatus according to a first embodiment of the present invention is applied, illustrating it together with a controller therefor.

FIGS. 1 to 5 illustrate a first embodiment of the present invention. Referring to FIG. 1, for example, left and right front wheels 2 and left and right rear wheels 3 (only one side illustrated in FIG. 1) are disposed below a vehicle body 1, which constitutes the body of a vehicle. Front wheel side suspensions 4 and 4 (hereinafter referred to as "front-wheel suspensions 4") are disposed between the respective front wheels 2 and the vehicle body 1.

The left and right front-wheel suspensions 4 are respectively constituted by left and right suspension springs 5 (hereinafter referred to as "springs 5"), and left and right shock absorbers 6 disposed between the left and right front wheels 2 and the vehicle body 1 in parallel with the respective springs 5. The left and right shock absorbers 6 each is constituted by a damping force adjustable hydraulic shock absorber provided with a frequency response unit 24, as will be described later.

Rear wheel side suspensions 7 and 7 (hereinafter referred to as "rear-wheel suspensions 7") are disposed between the left and right rear wheels 3 and the vehicle body 1. The left and right rear-wheel suspensions 7 are respectively constituted by left and right suspension springs 8 (hereinafter referred to as "springs 8"), and left and right shock absorbers 9 disposed between the left and right rear wheels 3 and the vehicle body 1 in parallel with the respective springs 8. The left and right shock absorbers 9 each is also constituted by the damping force adjustable hydraulic shock absorber provided with the frequency response unit 24, as will be described later. In the present embodiment, the damping force adjustable hydraulic shock absorber provided with the frequency response unit is disposed at each of the four wheels. However, the shock absorbers at the front-wheel side or the rear-wheel side may be shock absorbers having only the damping force adjustment function or only the frequency response function.

Now, referring to FIG. 2, the front wheel side and rear wheel side shock absorbers 6 (9) will be described. The front wheel side shock absorbers 6 and the rear wheel side shock absorbers 9 are basically configured in a similar manner, so only the front wheel side shock absorbers 6 will be described, and the rear wheel side shock absorbers 9 will be not described especially herein for eliminating redundancy.

Figure 2:
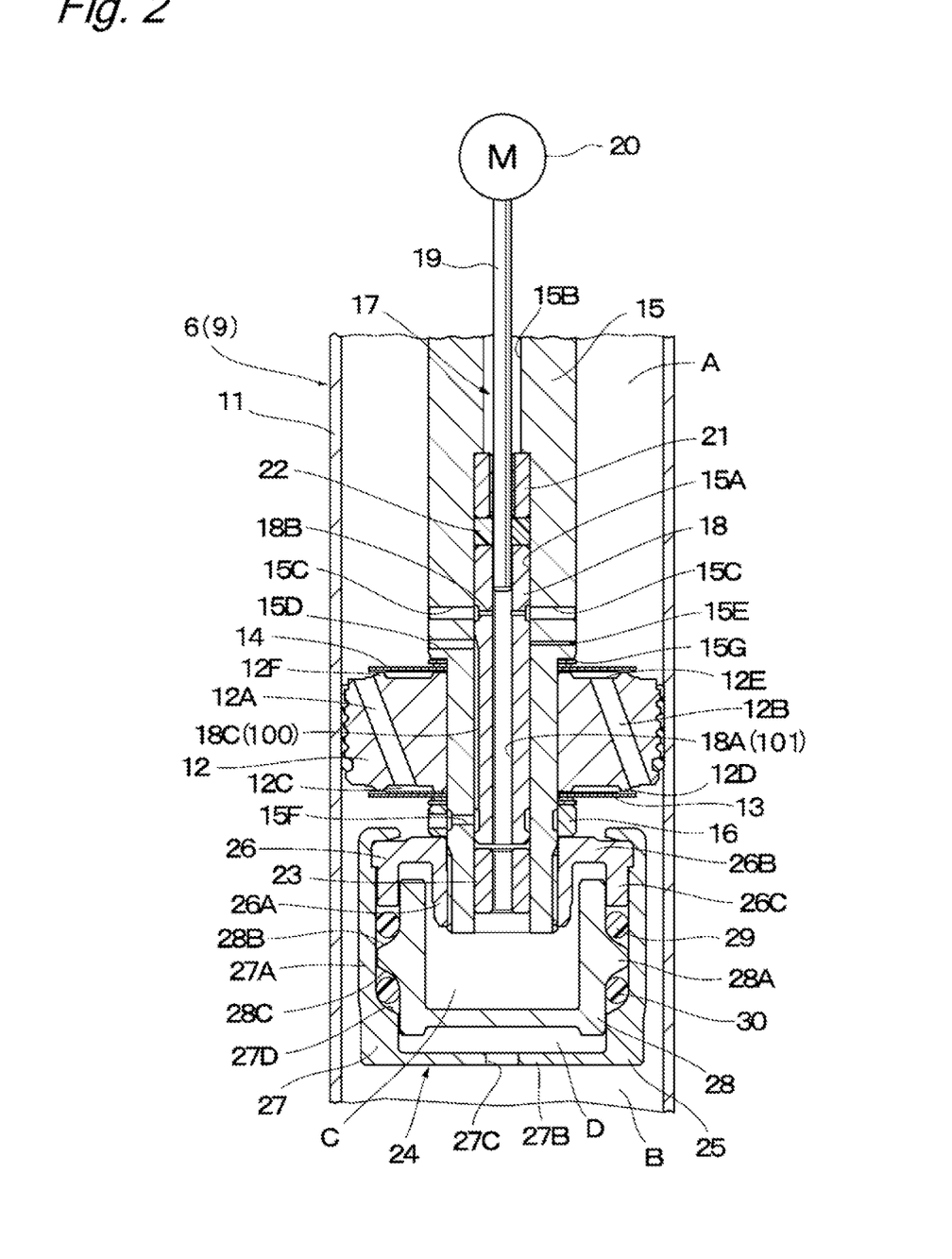
FIG. 2 is a vertical cross-sectional view illustrating main parts of a shock absorber mounted on the vehicle illustrated in FIG. 1 in an enlarged manner.

Referring to FIG. 2, an inner cylinder 11, which constitutes the cylinder of the shock absorber 6 (9), is coaxially disposed in an outer cylinder (not illustrated), which constitutes an outer shell of the shock absorber 6 (9). The lower end side of the inner cylinder 11 is fixed to the lower end side of the outer cylinder via a bottom valve (not illustrated). The upper end side of the inner cylinder 11 is fixed to the upper end side of the outer cylinder via, for example, a rod guide (not illustrated). Oil is sealingly contained in the inner cylinder 11 as operating fluid. An annular reservoir chamber (not illustrated), which sealingly contains oil and gas, is formed between the outer cylinder and the inner cylinder 11.

Reference numeral 12 denotes a piston slidably fittedly inserted in the inner cylinder 11, and the piston 12 divides the interior of the inner cylinder 11 into two chambers, a rod-side oil chamber A and a bottom-side oil chamber B. The piston 12 includes a plurality of oil passages 12A and a plurality of oil passages 12B for establishing communication between the rod-side oil chamber A and the bottom-side oil chamber B. The oil passages 12A are formed in a circumferentially spaced-apart relationship, and the oil passages 12B are formed in a circumferentially spaced-apart relationship. The oil passages 12A and 12B each are constituted by an oil hole obliquely inclined relative to the axis of the piston 12. The oil passages 12A and 12B constitute a main passage allowing an oil flow between the rod-side oil chamber A and the bottom-side oil chamber B.

Further, the piston 12 includes an annular recess 12C formed at the lower end surface of the piston 12 so as to surround one opening of the oil passage 12A, an annular valve seat 12D positioned at a radially outer side of the annular recess 12C and configured to allow an extension-side disk valve 13 to be seated on or separated from the annular valve seat 12D, an annular recess 12E formed on the upper end surface of the piston 12 so as to surround one opening of the oil passage 12B, and an annular valve seat 12F positioned at a radially outer side of the annular recess 12E and configured to allow a compression-side disk valve 14 to be seated on or separated from the annular valve seat 12F.

Reference numeral 15 denotes a piston rod axially extending in the inner cylinder 11. The lower end side of the piston rod 15 is inserted in the inner cylinder 11, and is disposed fixedly to the piston 12 by, for example, a covering nut 26 of a housing 25 which will be described later. Further, the upper end side of the piston rod 15 protrudes to the outside of the outer cylinder and the inner cylinder 11 via, for example, the above-described rod guide. The piston rod 15 includes a shutter insertion hole 15A and a rod insertion hole 15B formed on the inner circumferential side of the piston rod 15 so as to axially extending through the piston rod 15. The shutter insertion hole 15A is open to the lower end side of the piston rod 15, and a shutter 18, which will be described later, is rotatably inserted in the shutter insertion hole 15A. The rod insertion hole 15B extends upward from the upper end side of the shutter insertion hole 15A, and is smaller in diameter than the shutter insertion hole 15A.

Further, the piston rod 15 includes a plurality of oil holes 15C, 15D, 15E, and 15F radially outwardly extending from the shutter insertion hole 15A. The oil holes 15C, 15D, 15E, and 15F are formed in an axially and circumferentially spaced-apart relationship. Among these oil holes 15C to 15F, the oil holes 15C to 15E are positioned so as to be open to the rod-side oil chamber A, and the remaining oil hole 15F is positioned so as to be open to the bottom-side oil chamber B in the inner cylinder 11. The uppermost oil hole 15C among the oil holes 15C to 15F are constantly in communication with an inner hole 18A of the shutter 18, which will be described later, via a radially extending communication passage 18B.

The oil holes 15D and 15E positioned below the oil hole 15C are spaced apart from each other in the circumferential direction of the piston rod 15, and are approximately aligned in the axial direction of the piston rod 15. However, the oil holes 15D and 15E have different hole diameters (orifice diameters), and are selectively opened or closed by an oil groove 18C of the shutter 18, which will be described later. As a result, a damping force can be variably adjusted, as will be described later. Further, an annular stepped portion 15G is formed on the outer circumferential side of the piston rod 15, and the axial position of the compression-side disk valve 14 is determined between the stepped portion 15G and the piston 12.

The extension-side disk valve 13 disposed on the lower end surface of the piston 12, among the disk valves 13 and 14, generate a predetermined damping force by applying a resistive force to oil flowing through the oil passages 12A when the piston 12 is upwardly slidably displaced during an extension stroke of the piston rod 15. Further, the compression-side disk valve 14 disposed on the upper end surface of the piston 12 generates a predetermined damping force by applying a resistive force to oil flowing through the oil passages 12B when the piston 12 is downwardly slidably displaced during a compression stroke of the piston rod 15.

Reference numeral 16 denotes a port member disposed between the covering nut 26 of a frequency response unit 24, which will be described later, and the piston 12. The port member 16 is constituted by, for example, an annular ring fittedly disposed around the outer circumferential side of the piston rod 15. The port member 16 allows an inflow and outflow of the oil between the bottom-side oil chamber B and the oil hole 15F of the piston rod 15.

Reference numeral 17 denotes a damping force variable mechanism employed in the present embodiment, and the damping force variable mechanism 17 includes the shutter 18, which will be described later, a control rod 19, and an actuator 20, which may be embodied by, for example, a stepping motor. The actuator 20 of the damping force variable mechanism 17 is disposed, for example, at the protruding end side of the piston rod 15, and causes the shutter 18 to rotate via the control rod 19, which will be described later. At this time, the shutter 18 intermittently adjusts the damping force characteristic of the shock absorber 6 (9) through two or three or more levels by opening or closing, for example, the oil holes 15D and 15E of the piston rod 15.

The actuator 20 of the damping force variable mechanism 17 does not necessarily have to be configured to intermittently adjust the damping force characteristic, and may be configured to continuously change the damping force characteristic by forming the oil holes 15D and 15E so as to have an opening area gradually changing in the circumferential direction. Further, the actuator 20 may be constituted by not only an electric motor such as a stepping motor but also a linear actuator which may be embodied by, for example, a solenoid, to continuously adjust the damping force characteristic from the hard characteristic to the soft characteristic.

Reference numeral 18 denotes a shutter rotationally inserted in the shutter insertion hole 15A of the piston rod 15, and constitutes an opening area adjustment member of the damping force variable mechanism 17. The shutter 18 is disposed at the lower end side of the control rod 19 so as to rotate integrally with the control rod 19, and is configured to rotate in the shutter insertion hole 15A of the piston rod 15 together with the control rod 19. The control rod 19 is inserted in the rod insertion hole 15B of the piston rod 15, and the upper end side of the control rod 19 is coupled with an output shaft (not illustrated) of the actuator 20.

The shutter 18 includes the axially extending inner hole 18A formed on the inner circumferential side of the shutter 18. The lower end side of the inner hole 18A is in constant communication with an upper-side chamber C in the housing 25, which will be described later. Further, the shutter 18 includes the radially extending communication passage 18B establishing constant communication between the oil hole 15C of the piston rod 15 and the inner hole 18A. The shutter 18 further includes the oil groove 18C as an oil passage formed on the outer circumferential surface of the shutter 18 at a position spaced-apart from the communication passage 18B in the axial direction of the shutter 18. The oil groove 18C extends in the axial direction of the shutter 18, and the lower end side of the oil groove 18C is in constant communication with the oil hole 15F of the piston rod 15. Further, the upper end side of the oil groove 18C is selectively opened or closed to any of, for example, the oil holes 15D and 15E of the piston rod 15 according to a rotational operation of the shutter 18.

The inner hole 18A and the oil groove 18C of the shutter 18 constitute two passages extending in parallel with each other between the rod-side oil chamber A and the bottom-side oil chamber B in the inner cylinder 11. A first passage 100 of the two passages is constituted by, for example, the oil holes 15D and 15E of the piston rod 15, the oil groove 18C of the shutter 18, the oil hole 15F of the piston rod 15, and the port member 16. At the first passage 100, a damping force is generated according to a rotational operation of the shutter 18 (for example, the opening area of the oil hole 15D or 15E) when the oil flows through the oil groove 18C between the rod-side oil chamber A and the bottom-side oil chamber B. The oil holes 15D and 15E of the piston rod 15 constitute a damping force generation unit capable of adjusting the damping force by the actuator 20 via the shutter 18.

In this case, the first passage 100 is constituted by, for example, the oil holes 15D and 15E of the piston rod 15, the oil groove 18C of the shutter 18, the oil hole 15F of the piston rod 15, and the port member 16. The first passage 100 is formed so as to be usable as a common single passage shared by the extension side and the compression side. As a result, it is possible to realize a simple and uncomplicated structure of the flow route (passage) for establishing or blocking communication between the rod-side oil chamber A and the bottom-side oil chamber B in the inner cylinder 11.

On the other hand, a second passage 101 is constituted by, for example, the oil hole 15C of the piston rod 15, the communication passage 18B of the shutter 18, the inner hole 18A, and the upper chamber C which will be described later. The second passage 101 also serves as a bypass passage for bypassing the above-described damping force generation unit (the oil holes 15D and 15E) of the first passage 100. The second passage 101 works in such a manner that, when the oil flows through the inner hole 18A of the shutter 18 between the rod-side oil chamber A and the bottom-side oil chamber B, the damping force characteristic is variably controlled by the frequency response unit 24, which will be described later, regardless of the rotational position of the shutter 18.

Further, a cylindrical guide member 21 and a seal member 22 are disposed above the shutter 18 in the shutter insertion hole 15A of the piston rod 15. A cylindrical body 23, which constitutes a part of the second passage 101, is disposed below the shutter 18 in the shutter insertion hole 15A of the piston rod 15. The seal member 22 prevents a leak of oil from between the shutter insertion hole 15A and the control rod 19 to the outside. The cylindrical body 23 constitutes a fall prevention member for preventing the shutter 18 from falling from the shutter insertion hole 15A.

Reference numeral 24 denotes the frequency response unit disposed at the lower end side of the piston rod 15. As illustrated in FIG. 2, the frequency response unit 24 includes the cylindrical housing 25 configured to be displaced integrally with the piston rod 15 in the inner cylinder 11, a free piston 28 relatively movably disposed in the housing 25, which will be described later, and O-rings 29 and 30.

The housing 25 is constituted by the covering nut 26 as a cover member screwed to the lower end side of the piston rod 15, and a bottomed cylindrical body 27. The covering nut 26 is constituted by an inner nut portion 26A screwed to the outer circumference of the lower end side of the piston rod 15, an annular cover portion 26B extending radially outwardly from the upper end side of the inner nut portion 26A, and an outer cylindrical suspended portion 26C suspended downwardly from the outer circumferential side of the annular cover portion 26B and having an inner circumferential surface serving as a guide surface for the free piston 28. The lower end surface of the cylindrical suspended portion 26C constitutes a housing contact surface in contact with the O-ring 29, which will be described later.

The bottomed cylindrical body 27 is constituted by a cylindrical portion 27A having an upper end side fixed to the annular cover portion 26B of the covering nut 26 from the outside by some means such as swaging and extending downward in the inner cylinder 11, and an annular bottom plate portion 27B closing the lower end side of the cylindrical portion 27A. The bottom plate portion 27B includes a communication hole 27C formed at the center side of the bottom plate portion 27B for establishing communication between the lower side chamber D, which will be described later, and the bottom-side oil chamber B.

An inclined arc surface 27D is formed at the inner circumferential side of the cylindrical portion 27A as a housing contact surface in contact with the O-ring 30, which will be described later. This inclined arc surface 27D constitutes an inclined and curved surface relative to the movement direction (i.e., the axial direction) of the free piston 28, which will be described later. The inclined arc surface 27D functions to elastically compress and deform the O-ring 30 between the inclined arc surface 27D and an annular protrusion 28A, which will be described later, when the free piston 28 is displaced downward, and use the resistive force therefrom to damp the displacement of the free piston 28 toward the stroke end.

Reference numeral 28 denotes the free piston slidably disposed in the housing 25. As illustrated in FIG. 2, the free piston 28 is formed into a bottomed cylindrical piston, and has the annular protrusion 28A formed at the outer circumferential side thereof so as to radially outwardly protrude from an axially middle position. The free piston 28 is movably fittedly inserted at the lower end side of the free piston 28, which is one axial side, in the cylindrical portion 27A of the bottomed cylindrical body 27, and is movably fittedly inserted at the upper end side of the free piston 28, which is the other axial end, in the cylindrical suspended portion 26C of the covering nut 26.

The free piston 28 is axially relatively displaced in the housing 25, and the stroke ends of the free piston 28 in the vertical direction are determined by abutment of the free piston 28 against the annular cover portion 26B of the covering nut 26 and the bottom plate portion 27B of the bottomed cylindrical body 27. The free piston 28 divides the interior of the housing 25 (i.e., the second passage 101) into the upper chamber C at the upstream side and the lower chamber D at the downstream side. In other words, the interior of the housing 25 constituting a part of the second passage 101 is divided into the upper chamber C and the lower chamber D by the free piston 28.

The second passage 101 is closed by the free piston 28, thereby preventing generation of a flow for exchanging oil between the rod-side oil chamber A and the bottom-side oil chamber B. However, while the free piston 28 is vertically relatively moving in the housing 25, the oil is introduced from the rod-side oil chamber A into the upper chamber C or discharged from the upper chamber C into the rod-side oil chamber A, and the same amount of the oil is introduced from the lower chamber D into the bottom-side chamber B or discharged from the bottom-side chamber B into lower chamber D via the communication hole 27C of the bottomed cylindrical body 27. This means that, also in the second passage 101, an oil flow is substantially generated.

The annular protrusion 28A formed on the outer circumference of the free piston 28 has upper and lower surfaces formed as inclined arc surfaces 28B and 28C, and these inclined arc surfaces 28B and 28C constitute free piston contact surfaces in contact with the O-rings 29 and 30, which will be described later. The inclined arc surfaces 28B and 28C constitute inclined and curved surfaces relative to the axial direction of the free piston 28. The inclined arc surface 28B of the free piston 28 is located axially opposite of the O-ring 29 from the lower end surface of the cylindrical suspended portion 26C. The inclined arc surface 28C is located axially opposite of the O-ring 30 from the inclined arc surface 27D of the bottomed cylindrical body 27.

Reference numerals 29 and 30 denote O-rings as elastic members constituting a resistive element of the frequency response unit 24. The O-rings 29 and 30 are disposed between the cylindrical portion 27A of the housing 25 and the outer circumferential surface of the free piston 28, and provide a liquid-tight seal therebetween. The upper chamber C and the lower chamber D in the housing 25 are maintained in a sealingly closed state from each other by the O-rings 29 and 30.

When the free piston 28 is displaced upward in the housing 25, the O-ring 29 is elastically compressed and deformed between the lower end surface of the cylindrical suspended portion 26C and the annular protrusion 28A (inclined arc surface 28B) of the free piston 28. At this time, the O-ring 29 generates a resistive force against the upward displacement of the free piston 28 toward the stroke end. On the other hand, when the free piston 28 is displaced downward in the housing 25, the O-ring 30 is elastically compressed and deformed between the inclined arc surface 27D of the cylindrical portion 27A and the annular protrusion 28A (the inclined arc surface 28C) of the free piston 28. At this time, the O-ring 30 generates a resistance force against the downward displacement of the free piston 28 toward the stroke end.

The frequency response unit 24, which is positioned in the inner cylinder 11 and disposed at the lower end side of the piston rod 15 as illustrated in FIG. 2, functions to reduce a damping force to be generated due to a reduction in the oil amount flowing through, for example, the communication passage 18B of the shutter 18 by an axial relative displacement of the free piston 28 in the housing 25 against a high-frequency vibration generated when the vehicle is running.

The shock absorber applicable to the present invention may be any shock absorber having the frequency response unit and the damping force adjustment unit using the actuator. The frequency response unit may be configured to support the free piston 28 by a coil spring, and may be a type establishing or blocking communication between the rod-side oil chamber A and the bottom-side oil chamber B by the free piston 28. Further, in the present embodiment, the damping force adjustment unit using the actuator is embodied by the rotational shutter 18 by way of example. However, this may be embodied by a vertically movable member or may be embodied by a pilot-control type damping value. Further, the damping force adjustment unit using the actuator may be a type attachable to the side surface of the outer cylinder. Further, the present embodiment has been described based on an example of a double-cylinder shock absorber. However, the shock absorber may be a monolithic-cylinder shock absorber.

Reference numeral 31 denotes a sprung-side vertical acceleration sensor (hereinafter referred to as "G sensor 31") mounted on the vehicle body 1. The G sensor 31 detects an acceleration of a vertical vibration at the vehicle body 1, which corresponds to the sprung side. In the present embodiment, disposing one G sensor 31 at the vehicle body 1 for one vehicle is sufficient, since the controller 37 can obtain vehicle operation information from a CAN 32 and information from other devices and sensors, as will be described later. However, for example, three G sensors 31 in total may be mounted on the vehicle body 1. In this case, the G sensor 31 is mounted on the vehicle body 1 at a position near the upper end side (the rod protrusion end side) of the shock absorber 6 at each of the front wheels 2, and is also mounted on the vehicle body 1 at a middle position between the left and right rear wheels 3.

Reference numeral 32 denotes a CAN as a serial communication unit mounted on the vehicle body 1. The CAN 32 performs multiplex communication for in-vehicle devices, between a large number of electronic apparatuses mounted on the vehicle and the controller 37. In this case, examples of vehicle operation information transmitted to the CAN 32 include detection signals (information) from, for example, a steering angle sensor 33, a brake state detector 34, an accelerator sensor 35, and a wheel speed sensor 36.

As illustrated in FIG. 1, a steering angle sensor 33 is disposed at a position of the vehicle body 1 near a driver's seat, and detects a steering operation of the vehicle. More specifically, the steering angle sensor 33 detects an operation amount of the steering wheel (not illustrated) of the vehicle, and outputs the detected signal from the CAN 32 to the controller 37, which will be described later. Further, for example, the brake state detector 34, the accelerator sensor 35, and the wheel speed sensor 36 are disposed at the vehicle body 1.

The brake state detector 34 detects, for example, an operation of pressing a brake pedal (not illustrated), and the state of a braking operation by an automatic brake function. The accelerator sensor 35 detects, for example, an operation of pressing the accelerator pedal (not illustrated). The vehicle speed sensor 36 is, for example, disposed near each of the left and right front wheels 2 and left and right rear wheels 3, and detects a rotational speed of each wheel as a vehicle speed.

Reference numeral 37 denotes a controller as a control means constituted by, for example, a microcomputer. As illustrated in FIG. 1, the controller 37 is connected at the input side thereof to, for example, the G sensor 31 and the CAN 32, and is connected at the output side thereof to, for example, the actuator 20 of each shock absorber 6 (9). The controller 37 reads a vertical vibration of the vehicle body 1 from the G sensor 31, and reads various kinds of detection signals from, for example, the steering angle sensor 33, the brake state detector 34, the accelerator sensor 35, and the wheel speed sensor 36 from the CAN 32 through serial communication.

The controller 37 includes a storage unit (not illustrated) constituted by, for example, a ROM, a RAM, and a non-volatile memory, a vehicle body vibration estimation unit 38 configured to estimate a vertical vibration as a movement of the vehicle, a sprung vibration damping control unit 39, a steering stability control unit 40, a vehicle speed response control unit 41, and a control instruction calculation unit 42. In particular, the controller 37 estimates a vibration of the vehicle body 1 by the vehicle body vibration estimation unit 38 based on the sensor information from the G sensor 31 and the CAN 32, estimates a steering state of the vehicle by the steering stability control unit 40 based on the sensor information from the G sensor 31 and the CAN 32, and estimates a running state of the vehicle by the vehicle speed response control unit 41.

The control instruction calculation unit 42 calculates a damping force instruction signal to be output to the actuator 20 of each shock absorber 6 (9) as a control instruction value (electric current value) according to control signals from the sprung vibration damping control unit 39, the steering stability control unit 40, and the vehicle speed response control unit 41 which are connected in parallel to one another. The actuator 20 of each shock absorber 6 (9) rotates the shutter 18 according to the electric current (damping force instruction signal) output from the control instruction calculation unit 42, thereby variably controls the damping force characteristic between the hard side and the soft side in a continuous manner or a stepwise manner.

The vehicle body vibration estimation unit 38 of the controller 37 can be configured to estimate a vibration (for example, a sprung speed and a pitch rate illustrated in FIG. 3) of the vehicle body 1 with use of, for example, the technique that the applicant of the present invention has proposed before (for example, Japanese Patent Public Disclosure Nos. 2009-83614, 2009-83641, 2009-262926, and 2010-083329, which are incorporated herein by reference).

Figure 3:
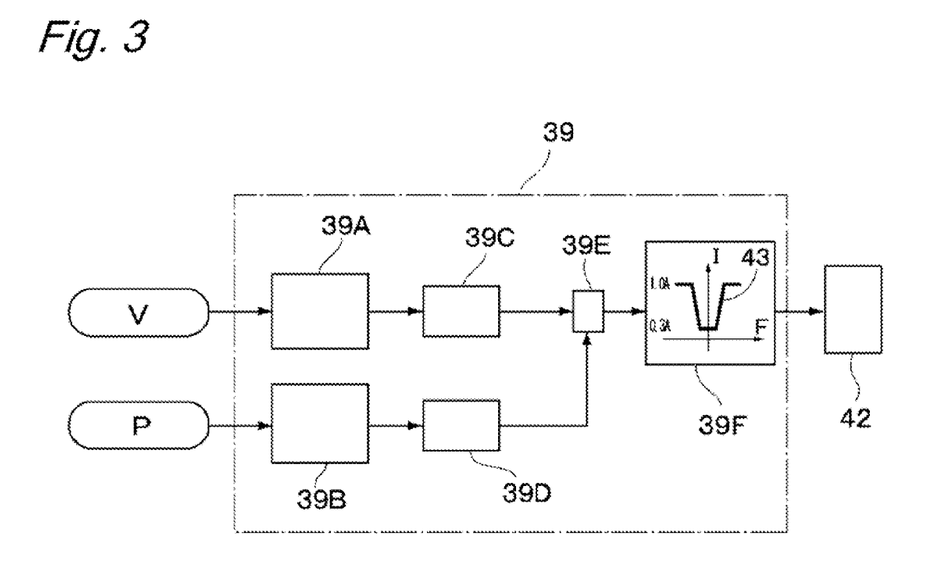
FIG. 3 is a block diagram illustrating the configuration of a sprung vibration damping control unit realized by the controller illustrated in FIG. 1.

As illustrated in FIG. 3, the sprung vibration damping control unit 39 includes first and second filter units 39A and 39B, first and second gain multiplication units 39C and 39D, an addition unit 39E, and a map calculation unit 39F. The sprung vibration damping control unit 39 filters a sprung speed V estimated by the vehicle body vibration estimation unit 38 by the first filter unit 39A to extract a low-frequency component. The second filter unit 39B filters a pitch rate P estimated by the vehicle body vibration estimation unit 38 to extract a low-frequency component. In other words, the first and second filter units 39A and 39B perform filtering processing for extracting a low-frequency component to thereby remove a high-frequency component from a control target, and realize damping force adjustment control according to the low-frequency component.

Preferably, a cut-off frequency for filtering of the first and second filter units 39A and 39B is set to a frequency equal to or lower than a cut-off frequency of the frequency response unit 24 (refer to FIG. 2). Further, preferably, the cut-off frequency is set so as to allow a sprung resonance to be extracted. Next, the first gain multiplication unit 39C multiplies the sprung speed filtered by the first filter unit 39A by a predetermined gain to calculate a target damping force F. The second gain multiplication unit 39D multiplies the pitch rate filtered by the second filter unit 39B by a predetermined gain to calculate the target damping force F.

The addition unit 39E adds the target damping forces F respectively calculated by the first and second gain multiplication units 39C and 39D. The map calculation unit 39F applies a map calculation to the target damping force F added by the addition unit 39E according to a characteristic line 43 indicated in FIG. 3 to calculate an instruction value I. In this case, according to normal Sky-Hook control, a control amount should be calculated from the relationship of a target damping force according to an extension/compression stroke (a relative speed) and a sprung speed. For example, when the sprung side is moving upward, an extension-side damping force functions to damp the vibration while a compression-side damping force functions to excite the vibration. Therefore, a signal should be output so as to achieve the target damping force during an extension stroke while a signal should be output to achieve a soft damping force during a compression stroke. However, according to the present embodiment, as illustrated in FIG. 2, the shock absorber 6 (9) is constituted by the damping force adjustable hydraulic shock absorber provided with the frequency response unit 24 (i.e., the shock absorber provided with the damping force adjustment function and the frequency response function). Therefore, since the excitation effect from a damping force is reduced by, for example, a delay in a rise of the damping force due to the interference of the frequency response unit, a control effect can be obtained even by using the instruction value I calculated only by substituting the target damping force F in the map of the characteristic line 43 illustrated in FIG. 3, and therefore the control calculation can be simplified.

The steering stability control unit 40 of the controller 37 calculates a control amount based on a steering angle signal from the steering angle sensor 33 and a vehicle speed signal from the wheel speed sensor 36 (for example, according to, a computing equation or a control rule using an estimation of a lateral acceleration), and outputs the calculated control amount to the control instruction calculation unit 42 as a control instruction value. In other words, anti-roll control is performed to control a damping force according to a lateral acceleration by the steering stability control unit 40.

Further, the steering stability control unit 40 also functions to perform anti-dive/squat control of estimating an acceleration of the vehicle body 1 in the front-rear direction from detection signals from the brake state detector 34 and the accelerator sensor 35, and controlling a damping force according to this estimation. On the other hand, the vehicle speed response control unit 41 is a control unit for adjusting a damping force according to a vehicle speed. Therefore, the vehicle speed detection control unit 41 calculates a control amount from, for example, the vehicle speed signal, and outputs the calculated control amount to the control instruction calculation unit 42 as a control instruction value.

Figure 4:
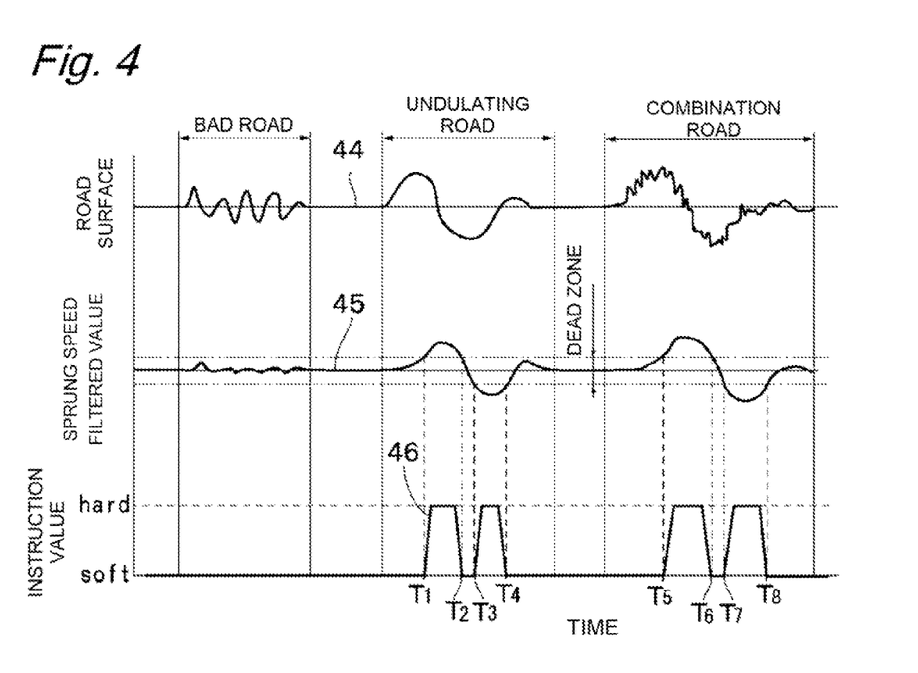
FIG. 4 illustrates characteristic lines concretely indicating the characteristic of the control instruction value for the damping force corresponding to road surface conditions.

A characteristic line 44 illustrated in FIG. 4 indicates one example of road surface conditions that the vehicle meets when being running, and represents a largely rugged bad road, an undulating road, and a combination road. The combination road has a surface condition that generates a low-frequency vibration and a high-frequency vibration in a superimposed state when a vehicle is running. A characteristic line 45 illustrated in FIG. 4 indicates a sprung speed filtering value, and represents an output signal of the first filter unit 39A of the sprung vibration damping control unit 39. As indicated by the characteristic line 45, for the bad road, the signal can be contained in the range of a predetermined dead zone by extracting a low-frequency component (filtering processing). On the other hand, for the undulating road and the combination road, a signal beyond the dead zone is output even after the extraction of the low-frequency component, for example, during the period of time $T_1$ to $T_2$, the period of time $T_3$ to $T_4$, the period of time $T_5$ to $T_6$, and the period of time $T_7$ to $T_8$.

A characteristic line 46 illustrated in FIG. 4 indicates the characteristic of the instruction value corresponding to the target damping force F that the first gain multiplication unit 39C calculates by multiplying a sprung speed output from the first filter unit 39A (the filtering value indicated by the characteristic line 45) by the gain. According to the instruction value indicated by the characteristic line 46, for example, the target damping force is set to the soft characteristic until time $T_1$, and is switched to the hard characteristic for the period $T_1$ to $T_2$ and the period $T_3$ to $T_4$. The target damping force is set to the soft characteristic during the period of time $T_4$ to $T_5$, is switched to the hard characteristic for the period of time $T_5$ to $T_6$ and the period $T_7$ to $T_8$, and is switched to the soft characteristic for the period after time $T_8$.

Therefore, as indicated by the characteristic line 46 illustrated in FIG. 4, the instruction value output from the sprung vibration damping control unit 39 is controlled so as to maintain a low damping force of the soft characteristic to improve the ride quality when the vehicle is running on the bad road, thereby protecting the ride comfort. On the other hand, when the vehicle is running on the undulating road, for example, the damping force is switched to the hard characteristic for the period of time $T_1$ to $T_2$ and the period of $T_3$ to $T_4$, thereby increasing the damping force to reduce the displacement at the sprung side to prevent the vehicle body 1 from having a floating movement.

When the vehicle is running on the combination road which generates a low-frequency vibration and a high-frequency vibration in a superimposed state, for example, the damping force is controlled so as to be maintained at the soft characteristic until time $T_5$, and is switched to the hard characteristic to be increased for the period of time $T_5$ to $T_6$, and the period of time $T_7$ to $T_8$. For such a road, in control according to the conventional technique, the damping force is set to the medium characteristic between the soft and hard characteristics to prevent the ride quality from being deteriorated. However, according to the present embodiment, the shock absorber 6 (9) is provided with the frequency response unit 24, whereby it is possible to reduce the damping force by the frequency response unit 24 without using, for example, the actuator when a high-frequency vibration occurs. Therefore, it is possible to set a high damping force during the period of time $T_5$ to $T_6$ and the period of time $T_7$ to $T_8$ while simplifying the control to realize a low cost system.

The suspension apparatus according to the first embodiment is configured as mentioned above, and functions in the following manner.

First, when the shock absorber 6 or 9 is mounted on the vehicle, the upper end side of the piston rod 15 is attached to the vehicle body 1 of the vehicle, and the bottom side of the outer cylinder is attached to the wheel side (the front wheels 2 and the rear wheels 3). When the vehicle is running, upon generation of a vertical vibration due to, for example, an uneven road surface, the shock absorber 6 or 9 is displaced in such a manner that the piston rod 15 is extended from or compressed in the inner cylinder 11. Then, a damping force can be generated by the extension-side or compression-side disk valve 13 or 14, the damping force variable mechanism 17 constituted by, for example the shutter 18 and the actuator 20, and the frequency response unit 24. As a result, the vibration of the vehicle can be damped.

More specifically, during an extension stroke of the piston rod 15, the piston 12 is slidably displaced upward in the inner cylinder 11, and therefore the inner pressure of the rod-side oil chamber A is increased to be higher than the inner pressure of the bottom-side oil chamber B, whereby the oil in the rod-side oil chamber A is introduced into the annular recess 12 through the oil passage 12A of the piston 12. This introduced oil generates a predetermined damping force by flowing into the bottom-side oil chamber B trough, for example, a cutout (not illustrated) formed on the extension-side disk valve 13. When the extension speed of the piston rod 15 is increased and the pressure difference between the inner pressures of the oil chambers A and B exceeds a release setting pressure in this state, the disk valve 13 is separated from the annular valve seat 12D to be opened, thereby generating a predetermined extension-side damping force.

Further, in the first passage 100, the oil in the rod-side oil chamber A is introduced into the shutter 18 through the oil holes 15C, 15D, and 15E of the piston rod 15. When the oil groove 18C of the shutter 18 is in communication with the oil hole 15D, the oil in the rod-side oil chamber A is introduced into the bottom-side oil chamber B through the oil hole 15D, the oil groove 18C, the oil hole 15F, and the port member 16. At this time, a relatively soft damping force can be generated. On the other hand, when the oil groove 18C of the shutter 18 is in communication with the oil hole 15E, the oil in the rod-side oil chamber A is introduced into the bottom-side oil chamber B through the oil hole 15E, the oil groove 18C, the oil hole 15F, and the port member 16. At this time, a relatively hard damping force can be generated since the oil flows through the oil hole 15E small in an orifice diameter.

In the second passage 101, the oil sent from the rod-side oil chamber A to the upper chamber C of the frequency response unit 24 through the oil hole 15C of the piston rod 15, the communication passage 18B of the shutter 18, and the inner hole 18A generates a force for displacing the free piston 28 downward against the O-ring 30 in the housing 25 (the bottomed cylindrical body 27). Then, when the free piston 28 is displaced downward in the housing 25 (when the vibration frequency is a high frequency), the oil flows through, for example, the communication passage 18B of the shutter 18, which generates a soft damping force, thereby reducing a damping force generated by the shock absorber 6 (9) as a whole.

On the other hand, during a compression stroke of the piston rod 15, the piston 12 is slidably displaced downward in the inner cylinder 11, and therefore the inner pressure of the bottom-side oil chamber B is increased to be higher than the inner pressure of the rod-side oil chamber A, whereby the oil in the bottom-side oil chamber B is introduced from the oil passage 12B of the piston 12 into the annular recess 12E. This introduced oil is then introduced into the rod-side oil chamber A through, for example, a cutout (not illustrated) formed on the compression-side disk valve 14, thereby generating a predetermined damping force. When the compression speed of the piston rod 15 is increased and the pressure difference between the inner pressures of the oil chambers A and B exceeds a release setting pressure in this state, the disk valve 14 is separated from the annular valve seat F to be opened, thereby generating a predetermined compression-side damping force.

Further, in the first passage 100, the oil in the bottom-side oil chamber B is introduced into the oil groove 18C of the shutter 18 through the port member 16 and the oil hole 15F of the piston rod 15. When the oil groove 18C of the shutter 18 is in communication with the oil hole 15D, a relatively soft damping force can be generated by the oil flowing from the oil groove 18C into the rod-side oil chamber A through the oil hole 15D. On the other hand, when the oil groove 18C of the shutter 18 is in communication with the oil hole 15E, a relatively hard damping force can be generated by the oil flowing from the oil groove 18C into the rod-side oil chamber A through the oil hole 15E.

Further, in the second passage 101, during a compression stroke of the piston rod 15, the oil in the bottom-side oil chamber B is introduced into the lower chamber D of the frequency response unit 24 through the communication hole 27C of the housing 25 (the bottomed cylindrical body 27). The oil introduced into the lower chamber D generates a force for displacing the free piston 28 upward against the O-ring 29 in the housing 25. When the free piston 28 is displaced upward in the housing 25 (when the vibration frequency is a high frequency), the oil is sent from the upper chamber C in the housing 25 to the rod-side oil chamber A through the inner hole 18A of the shutter 18, the communication passage 18B, and the oil hole 15C. The oil flows through, for example, the communication passage 18B of the shutter 18, which generates a soft damping force, thereby reducing a damping force generated by the shock absorber 6 (9) as a whole.

According to the first embodiment, as illustrated in FIG. 2, the shock absorbers 6 of the left and right front wheel suspensions 4, and the shock absorbers 9 of the left and right rear wheel suspensions 7 each are constituted by the damping force adjustable hydraulic shock absorber provided with the frequency response unit 24, and the controller 37, which controls drive of the actuator 20 of the damping force variable mechanism 17, is configured to variably adjust the damping force of the damping force variable mechanism 17 (the shutter 18) between the soft side and the hard side according to a vertical vibration when the vehicle body 1 vertically vibrates at a low frequency, and not adjust the damping force when the vehicle body vibrates at a higher frequency than the above-described low frequency.

According to this configuration, for example, as indicated by the characteristic lines 44 to 46 illustrated in FIG. 4, it is possible to maintain the ride quality of the vehicle even when the vehicle is running on the combination road with a low-frequency vibration and a high-frequency vibration superimposed on each other, only by, for example, performing control so as to maintain the soft characteristic until time $T_5$ and switching the damping force to the hard characteristic to increase the damping force during the period of time $T_5$ to $T_6$ and the period of time $T_7$ to $T_8$, while simplifying the processing of controlling the damping force.

In such a case, according to the control of the conventional technique, the damping force is set to the characteristic between the soft side and the hard side (medium characteristic) to prevent the ride quality from being deteriorated. However, according to the present embodiment, it is possible to reduce the damping force by the frequency response unit 24 when a high-frequency vibration occurs by providing the frequency response unit 24 to the shock absorber 6, 9, whereby it is possible to set a high damping force during the period of time $T_5$ to $T_6$ and the period of time $T_7$ to $T_8$, while realizing simplified and uncomplicated control processing.

Figure 5:
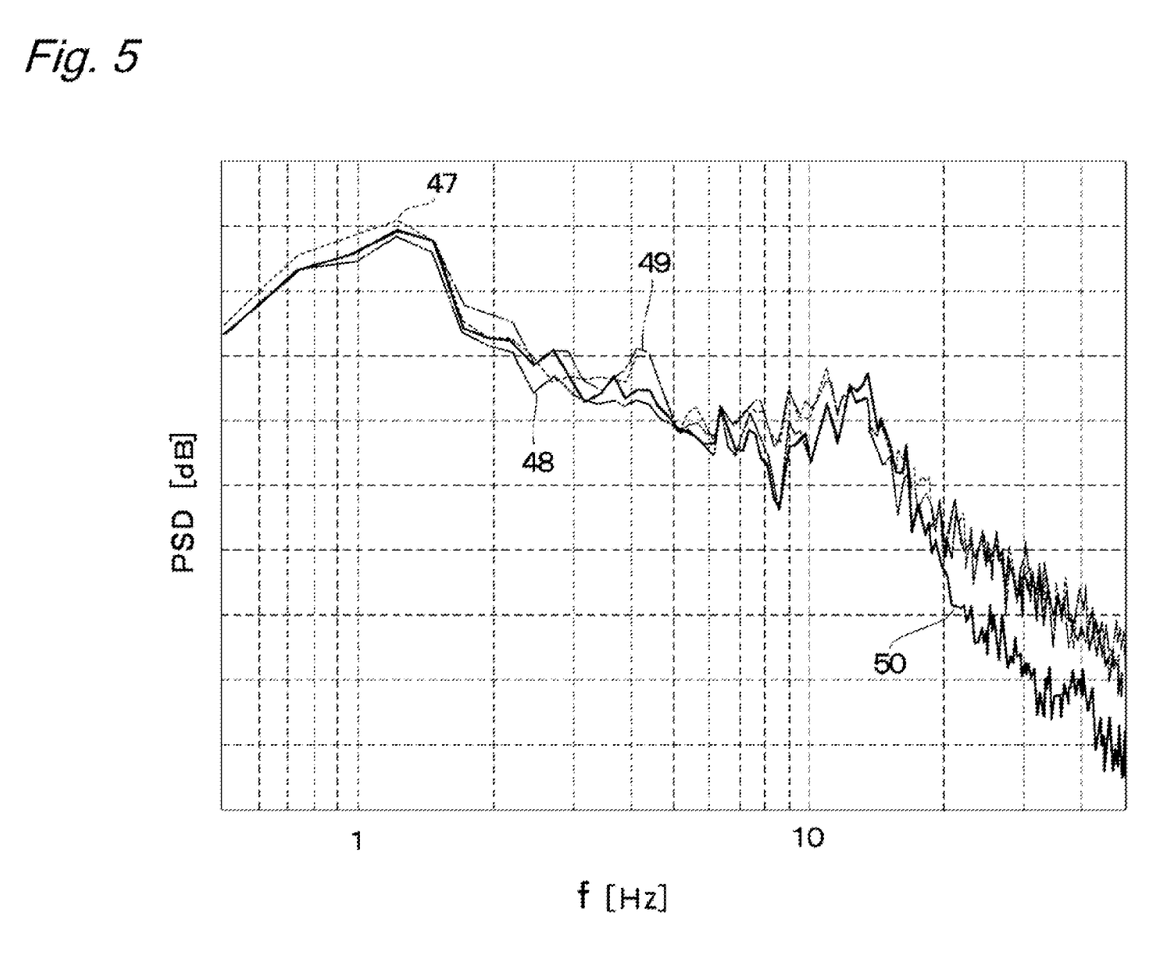
FIG. 5 illustrates characteristic lines indicating the characteristic of the sprung acceleration with respect to the vibration frequency when the vehicle is running, comparing it with conventional techniques.

Characteristic lines 47 to 50 illustrated in FIG. 5 are simulation results for enabling a comparison among conventional suspension apparatuses (the characteristic lines 47 to 49) and the suspension apparatus according to the present embodiment (the characteristic line 50 indicated by the solid line) in terms of ride quality. A vehicle model in consideration of a sprung vibration and an unsprung vibration is used as the simulation model. The shock absorber 6, 9 of the suspension apparatus according to the present embodiment are a model in which the damping force adjustable hydraulic shock absorber provided with the frequency response unit 24 is constructed by a hydraulic model.

Among the conventional suspension apparatuses, the characteristic of a shock absorber that does not have the damping force adjustable function is indicated by the characteristic line 47 of a dotted line, the characteristic of a semi-active suspension that performs Sky-Hook control is indicated by the characteristic line 48 of a two-dot chain line, and the characteristic of a conventional damping force adjustable hydraulic shock absorber is indicated by the characteristic line 49 of an alternate long and short dash line. The characteristic lines 47 to 50 illustrated in FIG. 5 indicate the characteristics of the power spectrum density PSD (dB) of the sprung acceleration with respect to the vibration frequency f (Hz) when the vehicle is running, respectively.

This result reveals that the standard damper shows a large sprung acceleration as indicated by the dotted characteristic line 47 in the sprung resonance frequency region around the vibration frequency f of approximately 1 Hz. On the other hand, the other suspension apparatuses (the Sky-Hook controllable semi-active suspension indicated by the characteristic line 48, the damping force adjustable hydraulic shock absorber indicated by the characteristic line 49, and the shock absorber 6 or 9 indicated by the characteristic line 50) show almost same sprung accelerations in the sprung resonance frequency region around 1 Hz, and comparable effectiveness for damping the displacement.

In the jiggle-like vibration (a vibration of a low frequency and a small amplitude) region around a vibration frequency 2 to 8 Hz, the Sky-Hook controllable semi-active suspension achieves the smallest sprung acceleration and therefore the smallest vibration level as indicated by the characteristic line 48. The shock absorber 6, 9 according to the present embodiment also achieve a small sprung acceleration and a small vibration level as indicated by the characteristic line 50, and can successfully reduce the vibration compared to the standard damper (the characteristic line 47) and the damping force adjustable hydraulic shock absorber (the characteristic line 49).

In the frequency region over the vibration frequency f of 8 Hz, the shock absorber 6, 9 (the characteristic line 50) according to the present embodiment is comparably or surpassingly effective for damping the vibration relative to the semi-active suspension (the characteristic line 48). Further, a comparison of the shock absorber 6, 9 according to the present embodiment to the standard damper (the characteristic line 47) and the damping force adjustable hydraulic shock absorber (the characteristic line 49) reveals that they show effectiveness of a same level in the frequency region lower than the frequency 5 Hz, but the shock absorber 6, 9 according to the present embodiment can largely reduce the vibration level in the frequency region higher than that, and is relatively highly effective for damping a vibration in this region.

As such, according to the present embodiment, the shock absorbers 6 of the left and right front wheel suspensions 4, and the shock absorbers 9 of the left and right rear wheel suspensions 7 are constituted by the damping force adjustable hydraulic shock absorber provided with the frequency response unit 24 (i.e., the shock absorber provided with the damping force adjustment function and the frequency response function), and the controller 37, which controls drive of the actuator 20 of the damping force variable mechanism 17, is configured to only control a low-frequency vibration among vibration frequencies when the vehicle is running.

Therefore, it is possible to improve the ride quality when the vehicle is running on a bad road, which is an object left to be achieved by the conventional technique in terms of damping force adjustment (damper apparatus), without sacrificing prevention of a floating movement. Further, the shock absorber 6, 9 can offer the ride comfort substantially comparably with the Sky-Hook controllable semi-active suspension that does not have the frequency response unit. In this way, the present embodiment can realize enhancement of the vibration damping effect and improvement of ride quality by the simplified system without detecting or calculating unsprung information.

In other words, the shock absorber 6, 9 mounted on each of the front and rear wheels is constituted by a combination of the damping force variable mechanism 17 and the function of the frequency response unit 24, and therefor can realize a simple, low-cost and high-performance suspension apparatus having a high cost performance ratio compared to the Sky-Hook controllable semi-active suspension without the frequency response unit. The control processing by the controller 37 can be focused to control of increasing the instruction value from the soft side to the hard side as indicated by the characteristic line 46 illustrated in FIG. 4 according to a low-frequency component of a sprung accelerator and a value of a sprung speed, since the controller 37 can relegate a response to a high-frequency input to the frequency response unit 24 of the shock absorber 6, 9.

Therefore, it is possible to reduce the number of times of switching (the number of times of the damping force adjustment) in the high-frequency region among the vibration frequencies when the vehicle is running, and thereby possible to improve the durability of the whole system. Further, since detection or estimation of unsprung information is unnecessary, it is possible to reduce the number of sensor input ports, ease the requirement for the microcomputer performance, and simplify the ECU circuit, thereby saving the manufacturing cost. Further, the control by this system makes it possible to realize both a reduction in a floating movement, which is one of problems in the conventional systems, and maintenance of the ride comfort in the high frequency region with a low-cost system.

The first embodiment has been described based on an example of controlling the damping force between the soft side and the hard side. However, the damping force may be switched linearly according to the value obtained by filtering a sprung speed, as is the case with the conventional Sky-Hook control.

Figure 6:
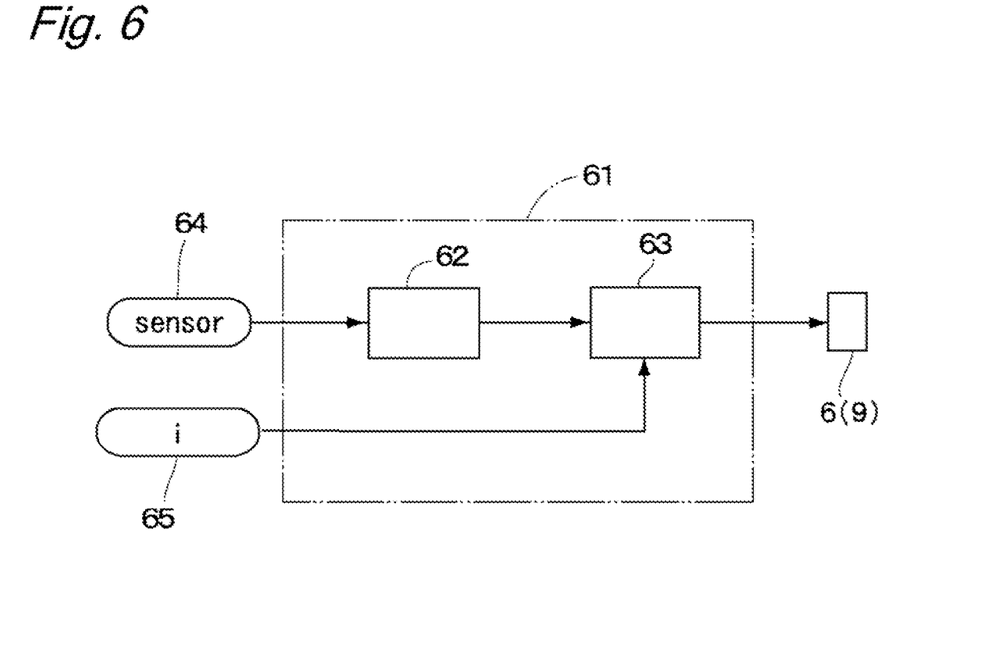
FIG. 6 is a block diagram illustrating the configuration of a controller employed in a second embodiment of the present invention.

Next, FIG. 6 illustrates a second embodiment of the present invention. The second embodiment is characterized in that it is configured to perform control for stabilizing the posture of the vehicle body as a movement of the vehicle. In the following description of the second embodiment, like components will be identified by the same reference numerals as those of the above-described first embodiment, and the descriptions thereof will be omitted.

A controller 61 employed in the present embodiment is configured in a substantially similar manner to the controller 37 in the first embodiment. The output-side of the controller 61 is connected to the actuators 20 of the shock absorbers 6 of the left and right front wheel suspensions 4 and the shock absorbers 9 of the left and right rear wheel suspensions 7. Each of the shock absorbers 6 (9) is constituted by the damping force adjustable hydraulic shock absorber provided with the frequency response unit 24 (i.e., the shock absorber provided with the damping force adjustment function the frequency response function). A difference of the second embodiment from the first embodiment is that the controller 61 in the second embodiment includes a posture change detection unit 62 and a control amount calculation unit 63.

A sensor information unit 64 connected to the input side of the controller 61 includes, for example, detection signals from the G sensor 31, the steering angle sensor 33 (refer to FIG. 1), the vehicle height sensor, the brake state detector 34, the accelerator sensor 35, and the wheel speed sensor 36 (refer to FIG. 1). Further, the sensor information unit 64 includes signals emitted by detecting a drive force of the engine and a brake force of the brake system, as well as information from a camera and a car navigation system mounted on the vehicle. Another information unit 65 connected to the input side of the controller 61 is, for example, a mode switch (for example, a selection switch of a sports mode and a normal mode).

The posture change detection unit 62 constitutes a posture change detection means for detecting at least one of a roll movement, a pitch movement, and a heave movement, which are movements of the vehicle. The posture change detection unit 62 detects, predicts, and estimates a posture change (for example, a roll, pitch, and heave state) of the vehicle body 1 based on the information from the sensor information unit 64. In other words, the posture change detection unit 62 may be a unit for predicting a posture change of the vehicle based on the detection of an operation state detection means (for example, a detection signal(s) of a steering angle, accelerator, a brake, a drive force, and/or a brake force).

The control amount calculation unit 63 calculates control signals for adjusting the damping forces of the shock absorbers 6 of the left and right front wheels 2 and the shock absorbers 9 of the left and right rear wheels 3 to output them to the actuators 20 of the respective shock absorbers 6 (9) as instruction values, in order to control a posture change of the vehicle body 1 (i.e., for example, a roll movement, a pitch movement, and a heave movement) according to a posture change signal output from the posture change detection unit 62 to stabilize the posture of the vehicle body 1.

In this way, also in the thus-configured second embodiment, the controller 61 can perform control processing while relegating a response to a high-frequency input to the frequency response unit 24 of each of the shock absorbers 6 and 9, and thereby can provide substantially similar effects to those of the above-described first embodiment. Especially, the second embodiment can control a posture change (for example, a roll movement, a pitch movement, and a heave movement), which are low-frequency movements of the vehicle, to stabilize the posture of the vehicle body 1. Therefore, the second embodiment can work well both for maintaining the ride comfort and preventing a floating movement when the vehicle is running on a bad road with a low cost system.

Figure 7:
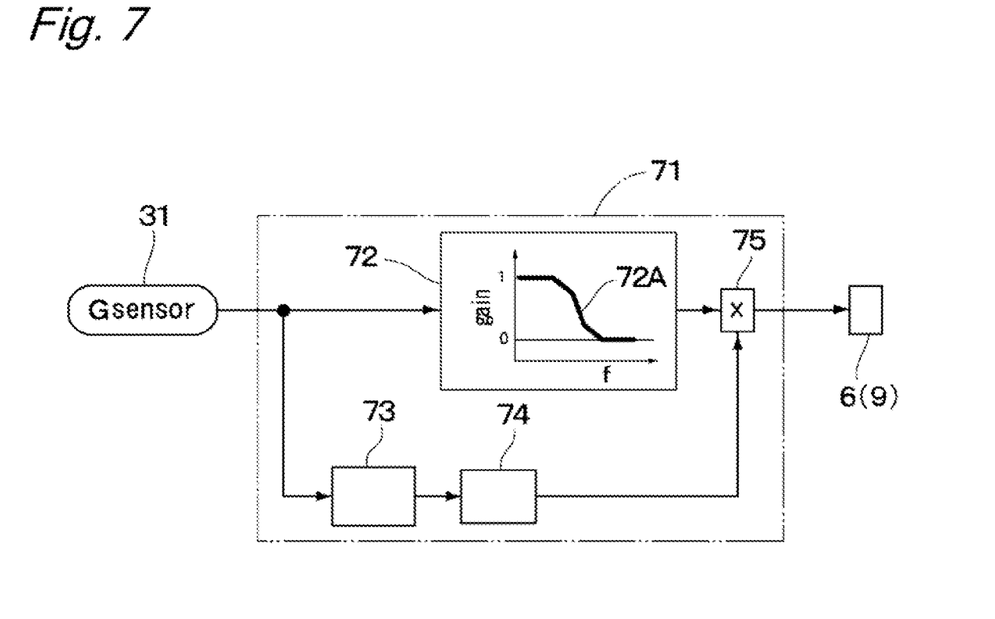
FIG. 7 is a block diagram illustrating the configuration of a controller employed in a third embodiment of the present invention.

Next, FIG. 7 illustrates a third embodiment of the present invention. The third embodiment is characterized in that the third embodiment is configured to detect a vertical vibration of the vehicle body by a vibration detector as a movement of the vehicle, and perform control to adjust the damping force according to the detection signal (vibration frequency). In the following description of the third embodiment, like components will be identified by the same reference numerals as those of the above-described first embodiment, and the descriptions thereof will be omitted.

A controller 71 employed in the present embodiment is configured in a substantially same manner as the controller 37 of the first embodiment. The output-side of the controller 71 is connected to the actuators 20 of the shock absorbers 6 of the left and right front wheel suspensions 4 and the shock absorbers 9 of the left and right rear wheel suspensions 7. Each of the shock absorbers 6 (9) is constituted by the damping force adjustable hydraulic shock absorber provided with the frequency response unit 24. A difference of the third embodiment from the first embodiment is that the controller 71 in the third embodiment includes a control gain adjustment unit 72, an integrator 73, a gain multiplication unit 74, and a multiplication unit 75.

The controller 71 acquires a vertical vibration of the vehicle body 1 from the G sensor 31 and calculates a vibration frequency thereof as a vibration detector. The vibration frequency may be calculated by separating a low-frequency component and a high-frequency component with use of a low-pass filter (not illustrated) and detecting a frequency according to the value thereof, may be calculated based on the cycle of the vibration, or may be calculated by, for example, the FFT analysis means. Thus-detected vibration frequency is input into the control gain adjustment unit 72.

The control gain adjustment unit 72 outputs a control gain (0≤gain≤1) according to the characteristic line 72A illustrated in FIG. 7. More specifically, when the input vibration frequency is a low frequency, the control gain adjustment unit 72 outputs, for example, the control gain "1". When the input vibration frequency is higher than the low frequency, the control gain adjustment unit 72 outputs, for example, a smaller control gain than "1" according to the characteristic line 72A. When the input vibration frequency is higher than a predetermined high frequency, the control gain adjustment unit 72 outputs, for example, the control gain "0", and at this time, the instruction value of the target damping force (for example, an electric current value) is set to 0, as will be described later.

The integrator 73 of the controller 71 calculates a vertical absolute speed (speed signal) by integrating the signal of the G sensor 31 (an acceleration of a vertical vibration). The gain multiplication unit 74 calculates a target damping force by multiplying the speed signal by a gain. Subsequently, the multiplication unit 75 multiplies the target damping force calculated by the gain multiplication unit 74 by the control gain (0 gain 1) output from the control gain adjustment unit 72, and then outputs an instruction value as a final target damping force according to the control gain to, for example, the actuator 20 of each shock absorber 6 (9).

Therefore, when the input vibration frequency is a low frequency, the control gain is set to "1" by the control gain adjustment unit 72, so the instruction value as the final target damping force output from the controller 71 is relatively large, thereby increasing the level of the instruction value (i.e., damping force adjustment). On the other hand, when the input vibration frequency is higher than the above-described low frequency, since the control gain set by the control gain adjustment unit 72 is gradually reduced than "1", so the instruction value is relatively small, thereby gradually reducing the level of the damping force adjustment. Then, when the input vibration frequency is higher than a predetermined high frequency, the instruction value of the target damping force (for example, an electric current value) is controlled to zero, so as to stop the damping force adjustment according to a movement (vertical vibration) of the vehicle.

In this way, also in the thus-configured third embodiment, the controller 71 can perform control processing while relegating a response to a high-frequency input to the frequency response units 24 of the respective shock absorbers 6 and 9, and thereby can provide substantially similar effects to those of the above-described first embodiment.

The first embodiment has been described based on an example in which the G sensor 31 and the CAN 32 are connected to the input side of the controller 37. However, the present invention is not limited thereto, and for example, the present invention may be configured in such a manner that four wheel speed sensors 36 in total, which are mounted on the left and right front wheels 2 and the left and right rear wheels 3, respectively, and the steering angle sensor 33 are connected to the input side of the controller. In this case, it is possible to detect a pitch state of the vehicle body 1 (a dive state and a squat state) based on the signals from the four wheel speed sensors 36 in total, and detect a roll state of the vehicle body 1 based on the signal from the steering angle sensor 33. This alternative also applies to the second embodiment.

Alternatively, the present invention may be configured in such a manner that, for example, two G sensors 31 in total, which are mounted on the front and rear wheel sides, respectively, two wheel speed sensors 36 in total, which are mounted on the left and right front wheels 2, respectively, and the steering angle sensor 33 are connected to the input side of the controller. Alternatively, the present invention may be configured in such a manner that, for example, three G sensors 31 in total, which are mounted on the left and right front wheels 2 and the middle position between the left and right rear wheels 3, respectively, two wheel speed sensors 36 in total, which are mounted on the left and right front wheels 2, respectively, and the steering angle sensor 33 are connected to the input side of the controller.

Further alternatively, the present invention may be configured in such a manner that a single vehicle height sensor, two wheel speed sensors 36 in total, which are mounted on the left and right front wheels 2, respectively, and the steering angle sensor 33 are connected to the input side of the controller. Further alternatively, the present invention may be configured in such a manner that, for example, two vehicle height sensors in total, which are mounted on the front wheels 2 and on the rear wheels 3, respectively, two wheel speed sensors 36 in total, which are mounted on the left and right front wheels 2, respectively, and the steering angle sensor 33 are connected to the input side of the controller.

Further alternatively, the present invention may be configured in such a manner that, for example, three vehicle height sensors in total, which are mounted on the left and right front wheels 2 and on the rear wheels 3, respectively, two wheel speed sensors 36 in total, which are mounted on the left and right front wheels 2, respectively, and the steering angle sensor 33 are connected to the input side of the controller. Further alternatively, the present invention may be configured in such a manner that, for example, four vehicle height sensors in total, which are mounted on the left and right front wheels 2 and the left and right rear wheels 3, respectively, two wheel speed sensors 36 in total, which are mounted on the left amid right front wheels 2, respectively, and the steering angle sensor 33 are connected to the input side of the controller.

As mentioned above, according to the present invention, the suspension apparatus can be configured in such a manner that a low-frequency movement is at least any one of a roll movement, a pitch movement, and a heave movement, which are vehicle movements. In this case, it is possible to correct a posture change such as a roll movement, a pitch movement, and a heave movement of the vehicle, which are low-frequency movements, to stabilize the posture of the vehicle body, and possible to work well for both maintaining ride comfort and preventing a floating movement when the vehicle is running on a bad road, even with use of a low-cost system.

According to the present invention, the posture change detection unit for detecting a roll movement, a pitch movement, and a heave movement of the vehicle can be constituted by an operation state detector, which detects a driver's operation. In this case, it is possible to predict or estimate a posture change of the vehicle by the operation state detector (for example, detection signals of a steering angle, the accelerator, the brake system, a drive force, and a brake force).

According to the present invention, the suspension apparatus can be configured in such a manner that a movement state is a vertical vibration of the vehicle, and the controller adjusts the damping force according to a vertical vibration of the vehicle when the vehicle vertically vibrates at a low frequency, and the controller adjusts the damping force at a smaller level than the damping force adjustment level of the movement of the low-frequency when the vehicle vertically vibrates at a higher frequency than the low frequency.

According to the present invention, the suspension apparatus can be configured in such a manner that a movement state is a vertical vibration of the vehicle, and the controller adjusts the damping force according to a vertical vibration of the vehicle when a vertical vibration at a predetermined low frequency occurs among vertical vibrations of the vehicle.

According to the present invention, the suspension apparatus includes the shock absorber disposed between the vehicle body side and the wheel side of the vehicle and capable of adjusting a damping force by the actuator, and the controller configured to adjust the actuator. The shock absorber includes the frequency response unit configured to reduce the damping force when a high-frequency vibration occurs. The controller adjusts the damping force according to a movement state when a movement of a low frequency occurs among movements of the vehicle, and the controller does not adjust the damping force according to the movement state or adjusts the damping force at a smaller level than a damping force adjustment level for the movement of the low-frequency when a movement of a higher frequency than the low frequency occurs.

According to the present invention, the suspension apparatus includes the shock absorber disposed between the vehicle body side and the wheel side of the vehicle and capable of adjusting a damping force by the actuator, and the controller configured to adjust the actuator. The shock absorber includes the frequency response unit configured to reduce the damping force when a high-frequency vibration occurs. The vehicle includes the vibration detector configured to detect a vibration of the vehicle. The controller adjusts the damping force according to a detection value of the vibration detector when the vibration detector detects a vibration of a low frequency, and the controller adjusts the damping force according to the detection value of the vibration detector at a smaller level when the vibration detector detects a vibration of a higher frequency than the low frequency.

According to the present invention, the shock absorber includes the damping force generation unit adjustable by the actuator. The frequency response unit includes the bypass passage for bypassing the damping force generation unit, and the free piston movably disposed in the bypass passage.

According to the above-described embodiments, the actuator does not have to respond to a high-frequency vibration, so the actuator can be embodied by a small solenoid, and the actuator can be even installed within the piston rod. Therefore, it is possible to reduce the axial length as the cylinder apparatus. Further, it is possible to simplify the control as mentioned above, and therefore possible to reduce the number of required sensors, leading to improvement of the mountability to the vehicle.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2011-075573, filed on Mar. 30, 2011. The entire disclosure of Japanese Patent Applications No. 2011-075573, filed on Mar. 30, 2011 including specification, claims, drawings and summary is incorporated herein by reference in its entirety.

What is claimed is:

1. A suspension apparatus comprising:
a shock absorber comprising a piston rod and a cylinder disposed between a vehicle body side and a wheel side of a vehicle, the shock absorber being capable of adjusting a damping force, the shock absorber including a damping force generation unit being capable of adjusting a damping force by an actuator; and
a controller configured to adjust the actuator,
wherein the shock absorber further includes a frequency response unit which is a different component from the damping force generation unit, the frequency response unit being configured to reduce the damping force when a high-frequency vibration occurs,
wherein the frequency response unit comprises a free piston which is provided in a passage connecting between two chambers formed by dividing the inside of the cylinder by a piston fixedly connected to the piston rod, the free piston is movable by a pressure difference between the two chambers in the cylinder, the damping force being reduced by a movement of the free piston,
wherein when the vehicle is running on a combination road which generates a vibration of the vehicle including a low-frequency vibration and a high-frequency vibration in a superposed state, the controller extracts the low-frequency vibration from the vibration of the vehicle, switches the damping force that is generated in the damping force generation unit according to a change of the low-frequency component in the extracted low-frequency vibration, and the controller removes a high-frequency component of a higher frequency than a lower frequency in the vibration of the vehicle from a control target.

2. The suspension apparatus according to claim 1, wherein the vibration of the vehicle is a sprung vibration of the vehicle.

3. The suspension apparatus according to claim 2, wherein the sprung vibration is a sprung speed.

4. The suspension apparatus according to claim 1, wherein the controller includes a steering stability control unit that performs at lease one of anti-roll control or anti-dive/squat control.

5. The suspension apparatus according to claim 1, wherein the controller adjusts the damping force without determination that the shock absorber is in an extension stroke or in a compression stroke.

6. A suspension apparatus comprising:
a shock absorber comprising a piston rod and a cylinder disposed between a vehicle body side and a wheel side of a vehicle, the shock absorber being capable of adjusting a damping force, the shock absorber including a damping force generation unit being capable of adjusting a damping force by an actuator; and
a controller configured to adjust the actuator,
wherein the shock absorber further includes a frequency response unit which is a different component from the damping force generation unit, the frequency response unit being configured to reduce the damping force when a high-frequency vibration occurs,
wherein the frequency response unit comprises a free piston which is provided in a passage connecting between two chambers formed by dividing the inside of the cylinder by a piston fixedly connected to the piston rod, the free piston is movable by pressure difference between the two chambers in the cylinder, the damping force being reduced by the movement of the free piston,
wherein the vehicle includes a posture change detector configured to detect at least any one of a roll movement, a pitch movement, and a heave movement of the vehicle, and
wherein the controller switches the damping force generated in the damping force generation unit according to a posture state of the vehicle detected by the posture change detector, and the controller removes a high-frequency component higher than lower frequency movement detected by the posture change detector from a control target.

7. The suspension apparatus according to claim 6, wherein the posture change detector comprises an operation state detector configured to detect a driver's operation.

8. The suspension apparatus according to claim 6, wherein the posture change detector predicts a posture change of the vehicle.

* * * * *